United States Patent
Miyashita

(10) Patent No.: US 7,114,478 B2
(45) Date of Patent: Oct. 3, 2006

(54) INTAKE SYSTEM OF OUTBOARD MOTOR

(75) Inventor: Yasushi Miyashita, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 11/084,149

(22) Filed: Mar. 21, 2005

(65) Prior Publication Data

US 2005/0205040 A1  Sep. 22, 2005

(30) Foreign Application Priority Data

Mar. 22, 2004  (JP) ............................. 2004-083188

(51) Int. Cl.
*F02M 35/10* (2006.01)
*F02B 61/04* (2006.01)

(52) U.S. Cl. ............................ 123/184.47; 123/184.55; 440/88 A

(58) Field of Classification Search ............ 123/195 P, 123/196 W, 184.42, 184.47, 184.55; 440/88 A, 440/88

See application file for complete search history.

(56) References Cited

U.S. PATENT DOCUMENTS

| | | | | |
|---|---|---|---|---|
| 5,630,390 A | * | 5/1997 | Tsunoda et al. | ......... 123/195 P |
| 6,293,839 B1 | * | 9/2001 | Tsunoda et al. | .......... 440/88 R |
| 2001/0052332 A1 | * | 12/2001 | Itoh et al. | .............. 123/184.42 |
| 2002/0117138 A1 | * | 8/2002 | Katayama | .............. 123/184.55 |
| 2003/0013360 A1 | * | 1/2003 | Isogawa | ...................... 440/77 |

* cited by examiner

*Primary Examiner*—Noah P. Kamen
(74) *Attorney, Agent, or Firm*—Oblon, Spivak, McClelland, Maier & Neustadt, P.C.

(57) ABSTRACT

An outboard motor includes an upright engine in which a plurality of cylinders are arranged vertically, an engine cover covering the engine, and an intake system for the engine. The intake system includes an intake manifold disposed on a side of the engine and provided with a surge tank and an intake pipe, in which the surge tank is arranged on the side of the engine inside the engine cover, the intake pipe is arranged on the inner surface side of the engine cover therein in a manner that the surge tank and the intake pipe are arranged parallel to each other.

11 Claims, 5 Drawing Sheets

INTAKE SYSTEM OF OUTBOARD MOTOR

BACKGROUND OF THE INVENTION

1. Field of the Invention

The present invention relates to an intake system of an outboard motor.

2. Description of the Related Art

An intake system of an outboard motor is generally disposed in a space defined between an engine and an engine cover which covers the engine.

Japanese Unexamined Patent Laid-open (KOKAI) Publication No. 2002-195118 discloses an outboard motor including intake pipes of different lengths in order to improve torque characteristics in the entire engine revolution range, from a low engine revolution range to a high engine revolution range. A switching operation to the intake pipes is performed according to operation condition of the engine.

That is, it is designed that, in a low-intermediate engine revolution range, the longer intake pipe is selected, and in the high revolution range, the shorter intake pipe is selected.

However, since the space between the engine and the engine cover is narrow, it is difficult to arrange therein the intake pipes of different lengths. Especially, since the intake pipe for the low-intermediate revolution range needs to be long, the arrangement thereof can be specifically restricted by the shape or size of the engine. Therefore, it is difficult to design the entire engine compactly.

In addition, although, in an arrangement in which an engine cover having an expanded size is utilized, the space for placing the intake pipes may be ensured, in a case of a large-displacement engine, there is a limit in the size of the engine cover according to the prescribed standard when mounting an outboard motor to a boat.

Furthermore, in the case of the large-displacement engine, the engine requires itself a long length from the front side to the rear side of the engine, and therefore, even if the intake pipe for the low-intermediate revolution range having an appropriate length is utilized, there is a possibility that a switching valve for switching from/to the intake pipe for the high revolution range is to be arranged to a side portion of the engine. In such case, the shape of the intake pipe for the low-intermediate revolution range is especially affected by the shape or size of the engine.

SUMMARY OF THE INVENTION

The present invention was conceived in consideration of the above circumstances, and an object of the present invention is to provide an intake system of an outboard motor having a compact size capable of providing torque characteristics in accordance with the revolution range of the engine.

This and other objects can be achieved according to the present invention by providing, in one aspect, an intake system of an outboard motor including an upright engine in which a plurality of cylinders are arranged vertically, an engine cover covering the engine, and an intake system for the engine, the intake system including an intake manifold disposed on a side of the engine and comprising a surge tank and an intake pipe, wherein the surge tank is arranged on a side of the engine inside the engine cover, and the intake pipe is arranged on an inner surface side of the engine cover therein in a manner that the surge tank and the intake pipe are arranged parallel to each other.

In preferred embodiment, the surge tank may include a tank main body and a tank cover, and a mating surface portion of the tank main body and the tank cover is substantially vertical and parallel to an axis of the cylinder of the engine. The tank main body has a surface facing the engine, which has a shape substantially coincident with a shape of the side surface of the engine.

A heat insulating material may be disposed at a mating portion between the tank main body and the engine.

It is desired that the intake pipe has an inlet opening formed to a front end portion thereof and another inlet opening formed to portion branched from an intermediate portion of the intake pipe so as to be opened to the inside of the surge tank. A switching valve may be provided at the branched portion for the another inlet opening so as to serve to open and close the another inlet opening when an engine revolution reaches a predetermined value.

The intake system may further include a throttle body disposed above the surge tank and a silencer disposed above the throttle body, the silencer and the throttle body being connected through an intake passage. On the contrary, the intake system may further include a throttle body disposed at a lower portion of the surge tank and a silencer disposed below the throttle body, the silencer and the throttle body being connected through an intake passage.

In a modified aspect, there is provided an intake system of an outboard motor including an upright engine in which a plurality of cylinders are arranged vertically, an engine cover covering the engine, and an intake system for the engine, the intake system disposed on one side of the engine and comprising:

an intake manifold including a surge tank, a surge tank cover and a plurality of intake pipes extending from the surge tank cover towards the cylinder of the engine, the surge tank being arranged on a side of the engine inside the engine cover, and the intake pipes being arranged on an inner surface side of the engine cover therein in a manner that the surge tank and the intake pipe are arranged parallel to each other;

a throttle body connected to a rear portion of the surge tank; and a silencer connected to the throttle body through an intake passage.

In the intake system of an outboard motor according to the present invention, the structure of the surge tank can be simplified, and the engine layout can be made simple and compact in both the longitudinal and width directions.

In addition, cool air can be taken in effectively and the improved engine power can be realized. Moreover, the intake volume necessary for performing an effective operation of the engine can be sufficiently secured, and utilization of dead space makes the intake system compact. Furthermore, the torque characteristics can be improved in the entire revolution range.

The nature and further characteristic features of the present invention will be made more clear from the following descriptions made with reference to the accompanying drawings.

DESCRIPTION OF THE PREFERRED EMBODIMENTS

Preferred embodiments of the present invention will be described hereunder with reference to the accompanying drawings.

It is first to be noted that terms of "upper", "lower", "right", "left" and the like terms used herein are based on the illustrations of the drawings or in a state of the outboard motor mounted to a boat or like in a normally operative state.

Figure 1:
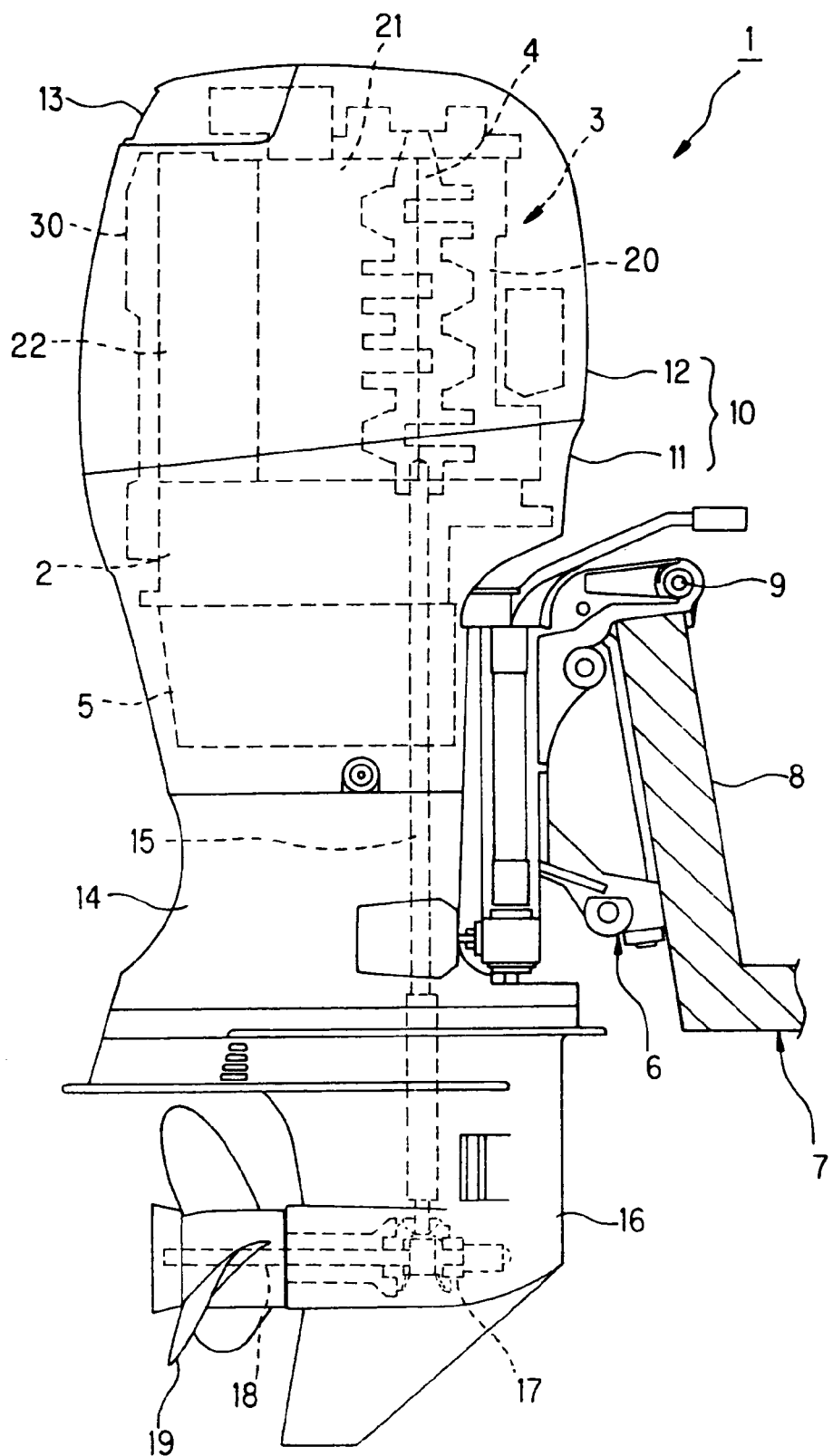
FIG. 1 is a right side view showing an outboard motor having an intake system according to a first embodiment of the present invention.

With reference to the first embodiment of the present invention shown in FIG. 1, the outboard motor 1 includes an engine holder 2, on which an engine 3 is mounted, and a crankshaft 4 extends substantially vertically in the engine 3.

An oil pan 5 for storing lubricating oil, not shown, is located under the engine holder 2. The outboard motor 1 is provided with a pair of lateral brackets (clamp brackets) 6, through which the outboard motor 1 is steerably fixed to a transom 8 of a boat 7. The outboard motor 1 can be tilted up around tilt shafts 9 of the brackets 6. The engine 3, the engine holder 2 and the oil pan 5 are covered by an engine cover 10.

The engine cover 10 includes upper and lower engine-cover sections 11 and 12. The lower engine-cover section 11 is fixed to the engine 3 so as to cover the lower half of the engine 3. The upper engine-cover section 12 is detachably attached to the lower engine-cover 11 so as to cover the upper half of the engine 3. An intake opening 13 is provided to the upper rear portion of the upper engine-cover section 12 to be opened backward so as to be capable of taking the air into the engine cover 10.

A driving shaft housing 14 is located under the oil pan 5. A driving shaft 15, acting as an output shaft of the engine 3, extends substantially vertically through the engine holder 2, the oil pan 5 and the driving shaft housing 14. The upper end of the driving shaft 15 is connected to the lower end of the crankshaft 4. The driving shaft 15 further extends downward through the driving shaft housing 14 into a gear case 16 arranged below the driving shaft housing 14. The driving shaft 15 drives a propeller 19 via a bevel gear 17 in the gear case 16 and a propeller shaft 18.

Figure 2:
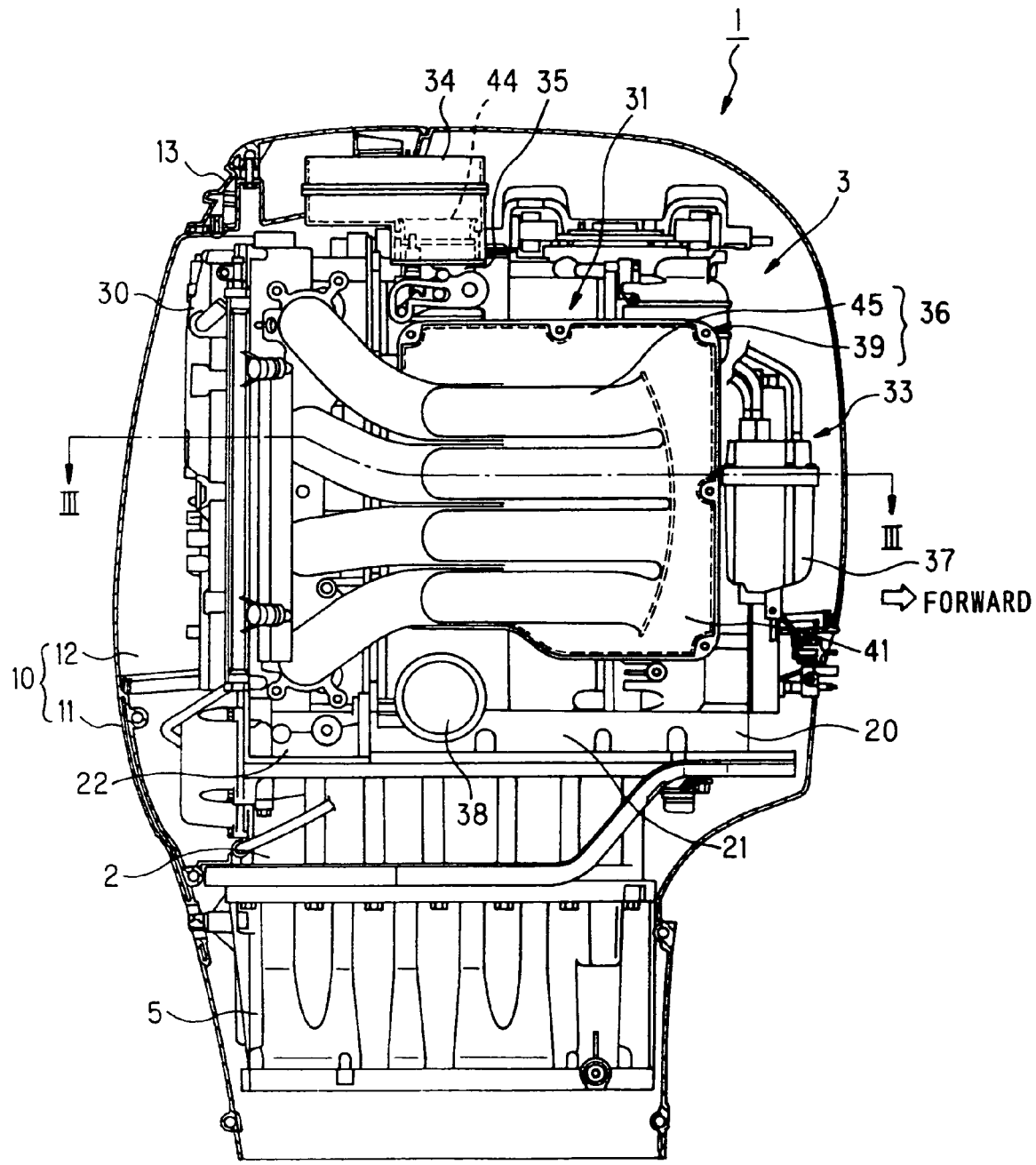
FIG. 2 is a right side view showing an inside of an engine cover of the outboard motor of FIG. 1.
Figure 3:
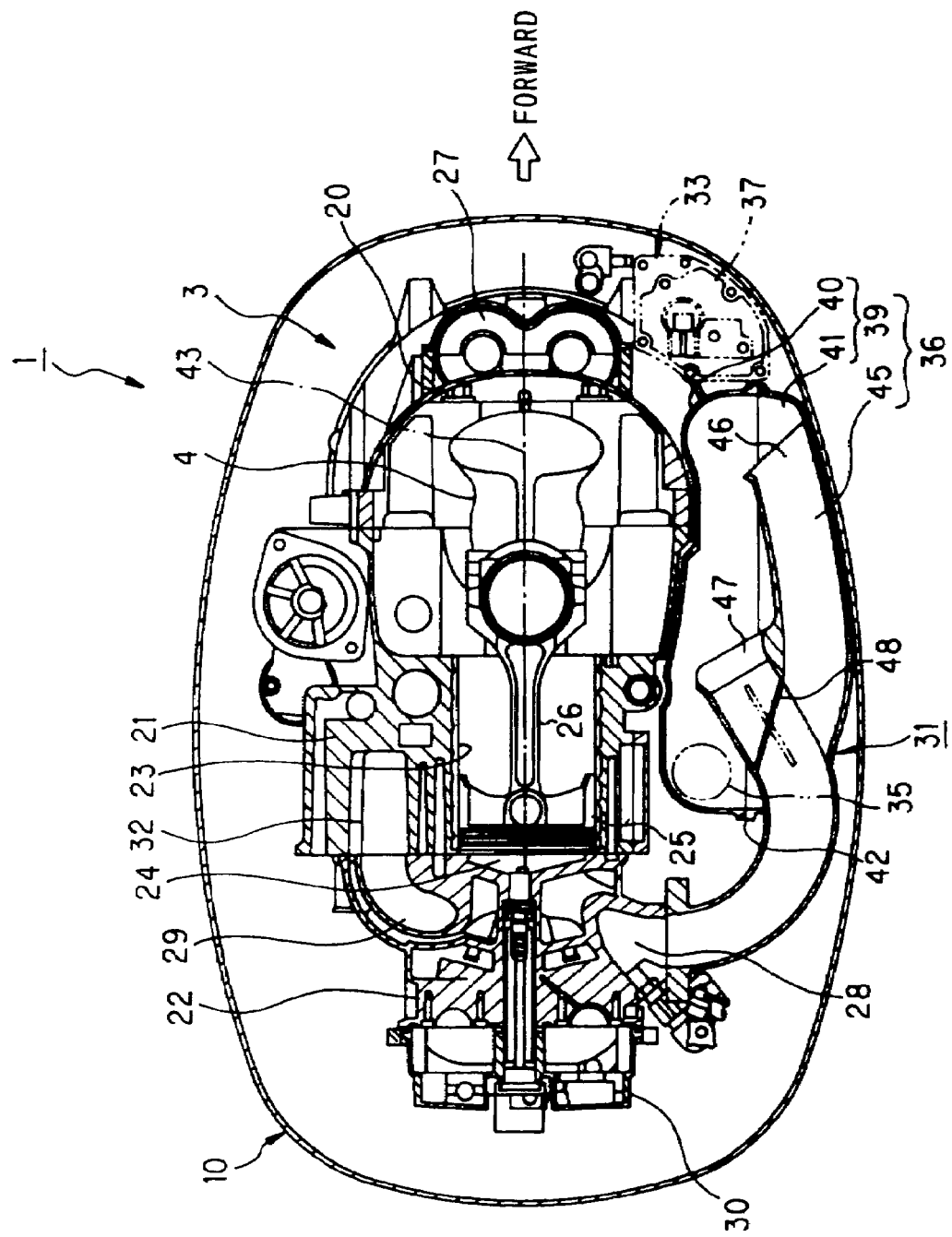
FIG. 3 is a sectional view taken along line III—III of FIG. 2.

With reference to FIG. 2 and FIG. 3, a crankcase 20 is located in the front of the engine 3 on the right side in the illustration of FIGS. 2 and 3. A cylinder block 21 is located behind the crankcase 20 on the left side of the crankcase 20 in FIGS. 2 and 3. A cylinder head 22 is disposed behind the cylinder block 2 1 on the left side of the cylinder block 21. The engine 3 is a water-cooled, four-stroke-cycle, four-cylinder engine. The engine 3 is also an upright engine, in which the cylinders 23 are arranged vertically in the cylinder block 21.

The crankshaft 4 is disposed substantially vertically at a mating surface of the crankcase 20 and the cylinder block 21. The cylinder head 22 is provided with combustion chambers 24 corresponding to the cylinders 23 in the cylinder block 21. Pistons 25 are inserted into the cylinders 23 to be reciprocally slidable. The pistons 25 are connected to the crankshaft 4 through connection rods 26, respectively. The reciprocal motion of the pistons 25 is converted into the rotational motion of the crankshaft 4. A balancer 27 including two balancer shafts is provided in front of the crankshaft 4.

The cylinder head 22 is provided with intake ports 28 and exhaust ports 29 communicating with the combustion chambers 24. Intake valves and exhaust valves, not shown, are disposed in the cylinder head 22. The intake valves serve to open and close the intake ports 28, and the exhaust valves serve to open and close the exhaust ports 29. A pair of camshafts, not shown, are disposed in the rear portion of the cylinder head 22. The camshafts serve to open and close the intake valves and the exhaust valves. The rear end of the cylinder head 22 is covered by a head cover 30.

An intake system 31, an exhaust system 32, a fuel supply system 33 and so on are disposed around the engine 3. The intake system 31 mainly includes a silencer 34, a throttle body 35 and an intake manifold 36. In the present embodiment, the intake system 31 is arranged in the space between the right side portion of the engine 3 and the inner surface of the engine cover 10, and on the other hand, the exhaust system 32 is placed on the left side of the engine 3. A vapor separator 37 is also disposed on the right side and in front of the engine 3, beside the balancer 27. The vapor separator 37 constitutes the fuel supply system 33 and includes a fuel pump, not shown, a regulator, not shown, and so on. An oil filter 38 is disposed on the right side of the cylinder block 21, below the intake system 31.

A surge tank 39 is disposed on the right side of the crankcase 20 and the cylinder block 21 of the engine 3. The surge tank 39 constitutes the intake manifold 36 and includes a tank main body 40 and a tank cover 41. A mating surface 42 of the tank main body 40 and the tank cover 41 is substantially vertical and parallel to the cylinder axis 43. The tank main body 40 is positioned on a side of the engine 3 inside the engine cover 10, and the tank cover 41 is disposed on an inner surface side of the engine cover 10 therein as shown in FIG. 3, for example. The surface of the tank main body 40 facing the engine 3 has a shape coincident with the shape of the side surfaces of the crankcase 20 and the cylinder block 21 of the engine 3.

The throttle body 35 is connected to a rear upper portion of the surge tank 39, and the silencer 34 is placed above the throttle body 35. The throttle body 35 and the silencer 34 are connected by an intake passage 44. The silencer 34 faces the intake opening 13 formed to the rear upper portion of the upper engine-cover section 12. Intake pipes 45 extend from the tank cover 41 of the surge tank 39 backward toward the respective cylinders. The intake pipes 45 are arranged vertically in parallel and connected to the intake ports 28 of the cylinder head 22. The intake pipes 45 constitute the intake manifold 36.

The front lower portion of the surge tank 39 protrudes downward so as to be disposed below the lowest intake pipe 45. Each intake pipe 45 has a first inlet 46 at its front end, i.e., upstream end, positioned in the front inside of the surge tank 39. The intake pipes 45 are integrated with the tank cover 41.

The first inlets 46 of the intake pipes 45 are arranged in a fan-like fashion or circular-arc shape as viewed from the side. As a result, the first inlets 46 take opening directions different from each other, thus reducing the intake interference and hence improving the intake efficiency.

Each intake pipe 45 also has a second inlet 47, which is formed to a portion branched from an intermediate portion downstream side of the intake pipe 45 and is opened to the rear inside portion of the surge tank 39. A switching valve 48 is provided at the branched portion of the second inlet 47 so as to serve to opens and closes the second inlet 47 when the engine revolution reaches a predetermined value. In the low-intermediate revolution range, as shown in a solid line in FIG. 3, the switching valve 48 closes the second inlet 47, and on the contrary, in the high revolution range, as shown in a chain double-dashed line in FIG. 3, the switching valve 48 opens the second inlet 47.

Figure 4:
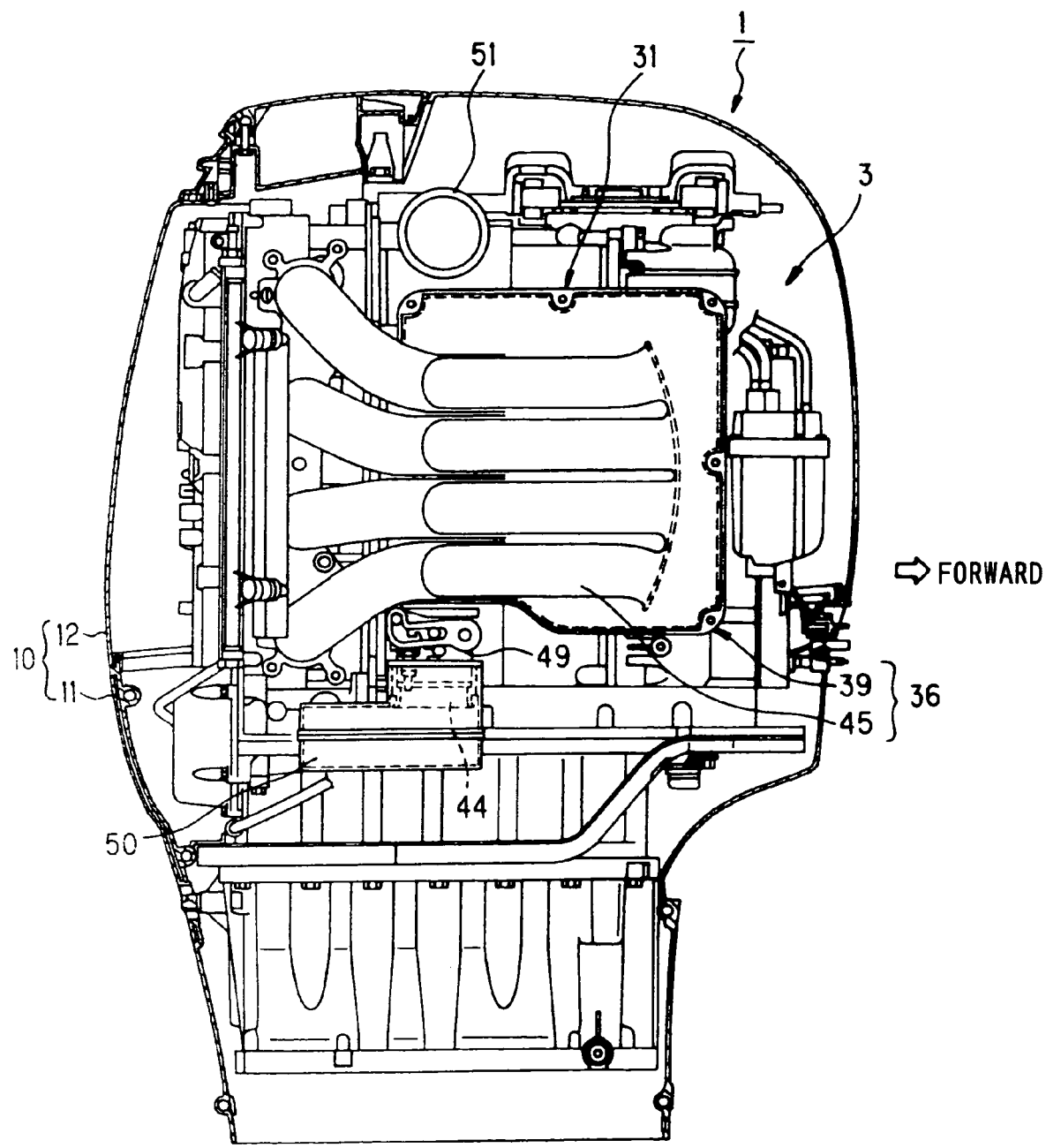
FIG. 4 is a right side view showing an inside of an engine cover of an outboard motor having an intake system according to a second embodiment of the present invention.

In the above-described first embodiment, the throttle body 35 is connected to the rear upper portion of the surge tank 39, and the silencer 34 is disposed above the throttle body 35. Alternatively, in the second embodiment shown in FIG. 4, the throttle body 49 may be connected to the rear lower portion of the surge tank 39, and the silencer 50 may be disposed below the throttle body 49. In this arrangement, the oil filter 51 is disposed above the intake system 31.

Figure 5:
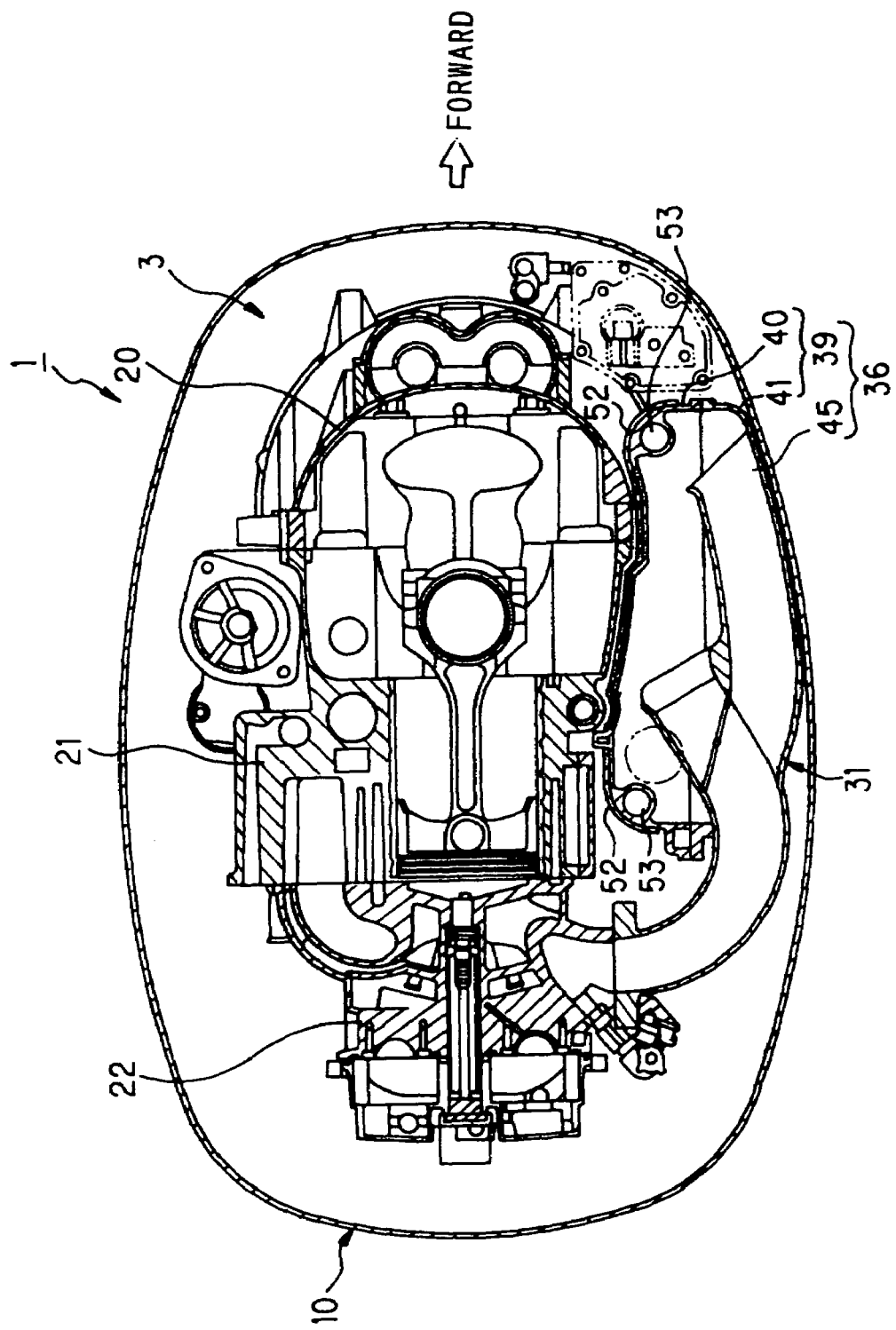
FIG. 5 is a sectional view, similar to that of FIG. 3, showing an engine of an outboard motor having an intake system according to a third embodiment of the present invention.

Furthermore, according to the third embodiment of the present invention shown in FIG. 5, in order to prevent the heat of the engine 3 from being conducted to the surge tank 39, an insulating sheet, for example, may be interposed as an insulation member between the engine 3 and the tank main body 40. Alternatively, the tank main body 40 may be provided with a cooling water jacket 53 through which the water for cooling the engine 3 flows.

In a further alternation, the surge tank 39 may be formed of a resin material having a low heat conductivity.

Advantageous function and operation of the embodiments of the present invention mentioned above will be described hereunder.

In the above embodiments, the surge tank 39 constituting the intake manifold 36 comprises the tank main body 40 and the tank cover 41, and the mating surface portion 42 between the tank main body 40 and the tank cover 41 is arranged to be substantially vertical and parallel to the cylinder axis 43. In addition, the tank main body 40 is disposed on one side of the engine 3, and the tank cover 41 is disposed on one side of the engine cover 10. The tank main body 40 and the tank cover 41 are arranged parallel to each other, and the intake pipes 45 are arranged integrally with the tank cover 41. According to such arrangement, the structure of the surge tank 39 can be simplified, and the throttle body 35 or 49 can be placed in any position on the upper or lower portion of the surge tank 39.

That is, the throttle body 35 or 49 can be placed beside the cylinder block 21, at which the engine 3 has its widest width. Therefore, the engine layout can be made compact in both the longitudinal and width directions. In addition, in the case where the throttle body 35 is disposed on the rear upper portion of the surge tank 39, the silencer 34 can be arranged in the vicinity of the intake opening 13 formed to the upper rear portion of the upper engine-cover section 12. Therefore, the cool air can be effectively taken in and the improved engine power can be realized. On the other hand, in the case where the throttle body 49 is disposed on the rear lower portion of the surge tank 39, a throttle cable, not shown, can be easily arranged and connected.

Furthermore, in the above embodiments, since the surface of the tank main body 40 facing the engine 3 has a shape coincident with the shape of the side surface of the engine 3, the volume necessary for the engine performance can be sufficiently secured. In addition, utilization of dead space makes it possible for the intake system 31 to be compact.

In the above embodiments, each intake pipe 45 has the second inlet 47 which is formed to a portion branched from the intermediate portion downstream side of the intake pipe 45 and is located in the rear inside portion of the surge tank 39. In addition, the switching valve 48 is provided at the branch point of the second inlet 47. The switching valve 48 serves to open and close the second inlet 47 when the engine revolution reaches a predetermined value. In the low-intermediate revolution range, the switching valve 48 closes the second inlet 47, and in the high revolution range, the switching valve 48 opens the second inlet 47, whereby the torque characteristics can be improved in the entire revolution range, from the low revolution range to the high revolution range.

It is to be noted that the present invention is not limited to the described embodiments and many other changes and alternations may be made without departing from the scopes of the appended claims.

What is claimed is:

1. An intake system of an outboard motor including an upright engine in which a plurality of cylinders are arranged vertically, an engine cover covering the engine, and an intake system for the engine,
said intake system including an intake manifold disposed on a side of the engine and comprising a surge tank and an intake pipe, wherein the surge tank is arranged on a side of the engine inside the engine cover, the intake pipe is arranged on an inner surface side of the engine cover therein in a manner that the surge tank and the intake pipe are arranged laterally in parallel to each other between one side surface of the engine and the engine cover.

2. The intake system of an outboard motor according to claim 1, wherein the surge tank comprises a tank main body and a tank cover, and a mating surface portion of the tank main body and the tank cover is substantially vertical and parallel to an axis of the cylinder of the engine.

3. The intake system of an outboard motor according to claim 2, wherein the tank main body has a surface facing the engine, which has a shape substantially coincident with a shape of the side surface of the engine.

4. The intake system of an outboard motor according to claim 2, wherein a heat insulating material is disposed at a mating portion between the tank main body and the engine.

5. The intake system of an outboard motor according to claim 1, wherein the intake pipe has an inlet opening formed to a front end portion thereof and another inlet opening formed to a portion branched from an intermediate portion of the intake pipe so as to be opened to the inside of the surge tank.

6. The intake system of an outboard motor according to claim 5, wherein a switching valve is provided at the branched portion of the another inlet opening so as to serve to open and close the another inlet opening when an engine revolution reaches a predetermined value.

7. The intake system of an outboard motor according to claim 1, wherein the intake system further includes a throttle body disposed on an upper surface of the surge tank and a silencer disposed above the throttle body, the silencer and the throttle body being connected through an intake passage.

8. The intake system of an outboard motor according to claim 1, wherein the intake system further includes a throttle body disposed below the surge tank and a silencer disposed on a lower surface of the throttle body, the silencer and the throttle body being connected through an intake passage.

9. An intake system of an outboard motor including an upright engine in which a plurality of cylinders are arranged vertically, an engine cover covering the engine, and an intake system for the engine, said intake system disposed on a side of the engine and comprising:

an intake manifold including a surge tank, a surge tank cover and a plurality of intake pipes, said surge tank being arranged on a side of the engine inside the engine cover, and said intake pipes being arranged on an inner surface side of the engine cover therein in a manner that the surge tank and the intake pipes are arranged laterally in parallel to each other between one side surface of the engine and the engine cover;

a throttle body connected to a rear portion of the surge tank; and a silencer connected to the throttle body through an intake passage.

10. The intake system of an outboard motor according to claim 9, wherein the throttle body is connected to the rear portion of the surge tank on an upstream side of the surge tank and on a rear side of the intake port of the intake pipe opened to the inside of the surge tank.

11. An intake system of an outboard motor including an upright engine in which a plurality of cylinders are arranged vertically, an engine cover covering the engine, and an intake system for the engine, said intake system including an intake manifold disposed on a side of the engine and comprising a surge tank and an intake pipe, wherein the surge tank is arranged on a side of the engine inside the engine cover, the intake pipe is arranged on an inner surface side of the engine cover therein in a manner that the surge tank and the intake pipe are arranged laterally in parallel to each other between one side surface of the engine and the engine cover;

said surge tank comprising a tank main body and a tank cover, wherein a mating surface portion of the tank main body and the tank cover is substantially vertical and parallel to an axis of the cylinder of the engine, and the tank main body has a surface facing the engine, which has a shape substantially coincident with a shape of the side surface of the engine.

* * * * *